(No Model.) 2 Sheets—Sheet 1.

O. ERICKSON.
SEEDER.

No. 491,994. Patented Feb. 21, 1893.

Witnesses.
A. H. Opsahl.
E. F. Elmore

Inventor.
Olaf Erickson
By his Attorney.
Jas. F. Williamson

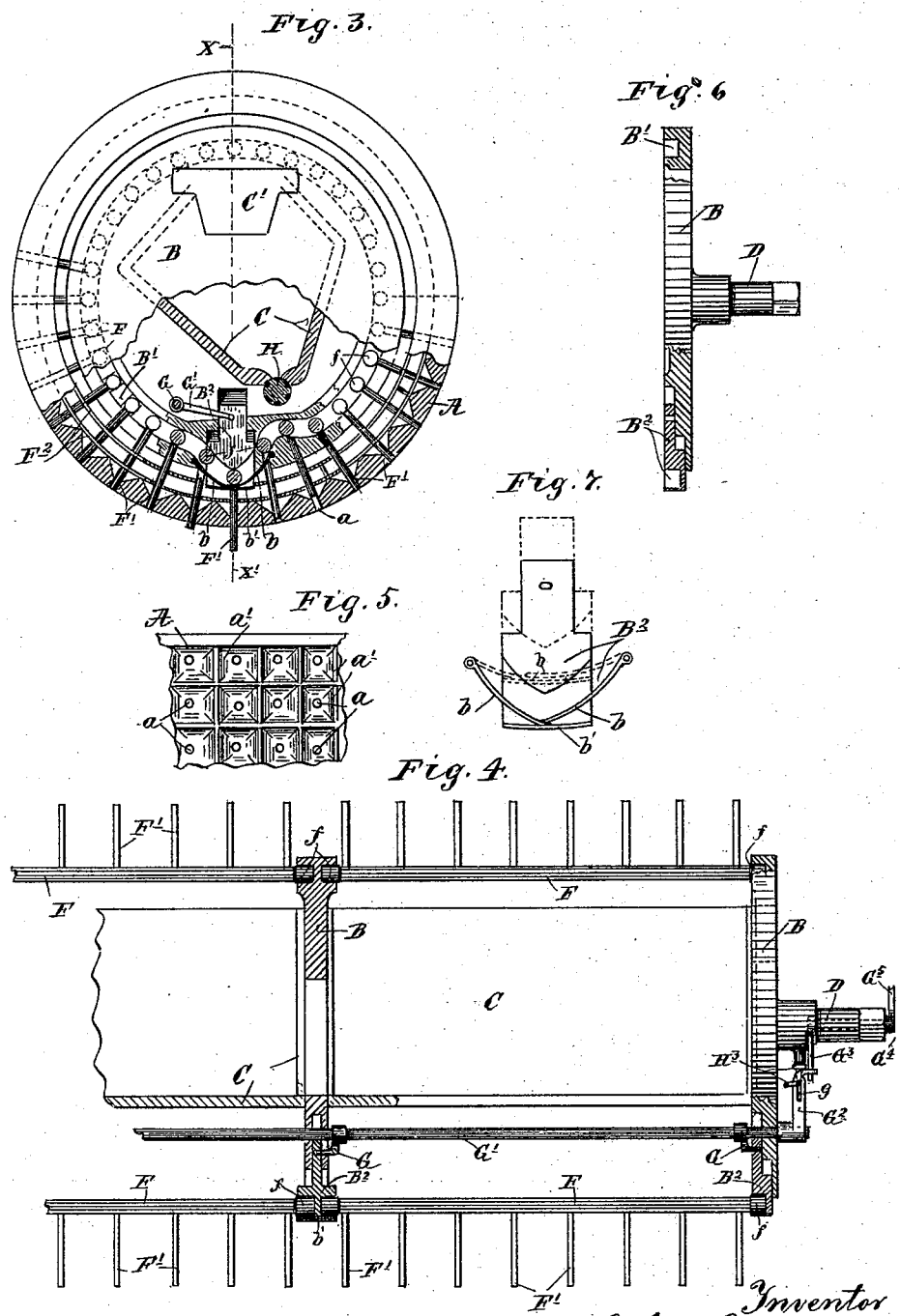

UNITED STATES PATENT OFFICE.

OLAF ERICKSON, OF CANNON FALLS, MINNESOTA.

SEEDER.

SPECIFICATION forming part of Letters Patent No. 491,994, dated February 21, 1893.

Application filed May 6, 1892. Serial No. 431,997. (No model.)

*To all whom it may concern:*

Be it known that I, OLAF ERICKSON, a citizen of the United States, residing at Cannon Falls, in the county of Goodhue and State of Minnesota, have invented certain new and useful Improvements in Seeders; and I do hereby declare the following to be a full, clear, and exact description of the invention, such as will enable others skilled in the art to which it appertains to make and use the same.

My invention relates to seeders, and has for its object to provide an efficient machine for this purpose.

Hitherto, so far as I am aware, seeders have been constructed either on the broadcast or the drill principle. Seeders constructed on the broadcast principle deliver and deposit the grain irregularly, or with unequal distribution. Seeders on the drill principle deposit the grain in rows with the kernels close together. I construct my machine on a different principle so that the kernels will be uniformly distributed, one or more in each place; and the machine is of such construction that the seed bed, on which the kernel is deposited, will be packed and that the covering will be a loose one. There is a great advantage in separately spacing the individual seeds or kernels of grain in this manner, as thereby each seed or kernel of grain, has an independent surface from which to draw its nourishment; and inasmuch as all the kernels will have equal areas of ground from which to draw their nourishment, a uniform stand or growth of the grain stalks is much more likely to be secured.

Figure 2:
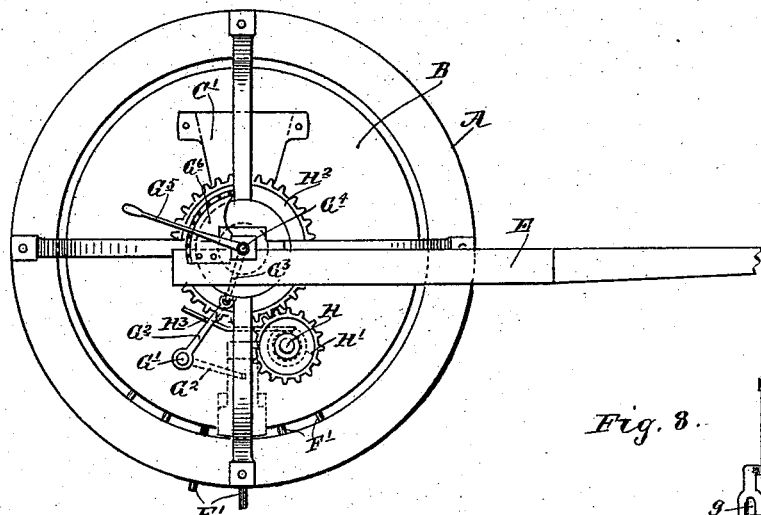
Figure 3:
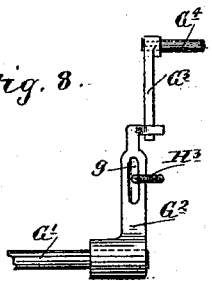
Figure 1:
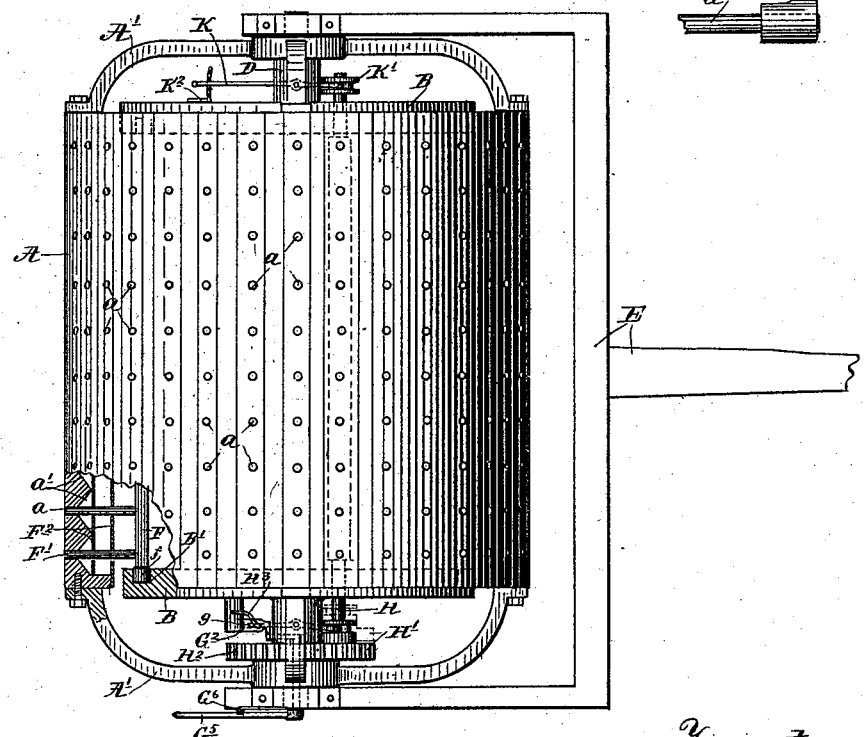

A machine embodying my invention is illustrated in the accompanying drawings. Therein like letters referring to like parts throughout. Figure 1 is a plan view of the entire machine, some parts being broken away. Fig. 2 is a right side elevation of the same, directions being taken with reference to the position of an observer looking in the direction of the travel of the machine. Fig. 3 is a view looking from the right, partly in side elevation and partly in section, with some parts broken away and others removed, in order to better show the relation of the parts within the drum. Fig. 4 is a vertical longitudinal section, approximately on the line X X' of Fig. 3, the drum being removed. Fig. 5 is a detail, in plan, showing the interior surface of the drum. Fig. 6 is an edge view, partly in elevation and partly in section, of one of the cam channel heads detached. Fig. 7 is a detail illustrating the adjustable portion of the cam channel. And Fig. 8 is a detail illustrating the connections for controlling the adjustable part of the cam channel and the forced feed of the feed box.

A represents a perforated drum which is revoluble over the ground, and is open at its ends. The perforations $a$, through the periphery of the drum, are radial and arranged in parallel rows lengthwise of the drum. The inner surface of the drum is provided with a corresponding series of depressed cells $a'$, which are preferably hopper-shaped, and have their centers co-incident with the radial holes $a$.

B are cam channel heads concentric with the drum. Each of these heads is provided with cam channels $B'$, $B^2$, of which $B'$ is a fixed channel, and $B^2$ an adjustable section of the same, the detailed construction of which will be noted later on. As shown, these cam channel heads are all rigidly secured together by the seed box C, which is of a length equal to that of the drum. The end heads B are each provided with outwardly extended stub-shafts D, which are rigidly secured to the side bars of a frame E, which is adapted for the attachment of draft animals. The drum A has secured to its ends spider-like heads $A'$, the hubs of which are mounted to turn on the stub shafts D. In virtue of this construction, the frame, cam channel heads and the seed box are all rigidly secured together and are carried by the drum. In other words, the drum revolves around the seed box and the cam channel heads.

Within the drum are a series of horizontal plunger bars F, the ends of which are provided with anti-friction rollers $f$, working in the cam channels of the cam channel heads. There are as many of these plunger bars as there are rows of perforations in the drum, and they are located in corresponding parallel arrangement. Each plunger bar carries a series of radial plungers or seeding fingers $F'$, which work through the corresponding radial holes in the periphery of the drum. The cam channels are so shaped that normally the seeding fingers F' do not protrude through the holes in the drum, but are seated therein flush with the periphery of the same. At a point radially opposite, the position of the drum as it reaches the ground, the cam channel is extended inward toward the center of the head so as to retract the fingers at that point and permit the seed or grain to enter the radial holes under the retracted fingers. And at a point opposite to the lowermost position of the drum on the ground, the cam channel is extended outward so as to force the fingers through the drum and into the ground. These two angular parts of the cam channels are directly adjacent to each other; and under their action, the seed or grain is admitted to the radial holes of the drum, and forced outward and deposited by the seeding fingers.

In order to vary the depth at which the seed is deposited, the outwardly extended part of the cam channel is made adjustable as before stated. This is accomplished as shown, by cutting away part of the fixed outer wall of the cam channel and substituting therefor a pair of overlapping pivoted flanges $b$; and by cutting away at a corresponding point the inner wall of the cam channel and a part of the cam channel head, and inserting therein a sliding block $B^2$, having cam surfaces formed thereon at acute angles adapted to take the place of the cut away part of the inner wall of the cam channel, and provided at its outer end with a laterally projecting flange $b'$ adapted to support the overlapping ends of the pivoted flanges $b$. This adjustable cam block $B^2$ is mounted for radial movement, and may be fixed and held in any desired position. To accomplish this result, all the cam blocks are secured to crank arms G on a common shaft G', which extends the entire length of the drum through suitable seats in the cam channel heads. The right end of this shaft projects through the right end cam channel head and is provided with a crank arm $G^2$, which is engaged by crank arm $G^3$ on a lever shaft $G^4$ which extends outward through a seat in the stub shaft D and is provided, outside the side bar of the frame, with an operating lever $G^5$. This operating lever may be locked in any desired position by a notched segment $G^6$ secured to the frame. By rocking the shaft G', through the hand lever $G^5$ and its connections, the cam blocks $B^2$ may be set and locked in any desired position.

The seed box, as shown, is provided with a suitable feed, of the shaft and cup variety, as shown at H. The feed shaft extends outward through the right hand cam channel head B, and is provided with a pinion H' adapted to engage with a gear $H^2$ carried on the hub of the right hand drum spider. The pinion H' is mounted to slide on the feed shaft H and is engaged by a shipper fork $H^3$ pivoted to the stub shaft D. The free end of the shipper fork is bent so as to be of angular form in the horizontal plane, and works through a slot $g$ in the crank arm $G^2$ of the shaft G'. The effect of this construction is to enable the driver to operate the shipper fork, for throwing the forced feed in and out of gear, by the same hand lever $G^5$, by which he controls the adjustable cam block $B^2$. The purpose of this construction and the relative arrangement of the connections to the adjustable sections of the cam channels and to the forced feed, is to enable the operator to throw the plunger bars into their inoperative position and the forced feed in and out of gear by one and the same movement.

To vary the quantity of feed, the feed shaft may be adjusted longitudinally in the ordinary way, by an adjusting lever K having one end in engagement with the grooved collar K' on the end of the shaft, and having the other end working over and adapted to engage with the notches of a fixed lock plate $K^2$.

The radial plungers or seeding fingers F' work through guide rings $F^2$ concentric with the drum, and secured to the interior of the same in any suitable way. The purpose of these guide rings is to assist in holding the plunger bars and the seeding fingers in proper position for their radial action; and to better enable the drum to carry the plunger bars in its rotary movement and force the same through their cam channels.

The seed box C may, of course, be of any suitable construction and be provided with any suitable means, as a removable door C', for access thereto to supply the grain or seed.

The operation of the machine is obvious from the description already given. Inasmuch as the cam channel heads are fixed to the frame; and inasmuch as the plunger bars with their radial plungers or seeding fingers are carried by the drum, the ends of the plunger bars, under the rotary movement of the drum, will be forced to travel through the cam channels. The cam channel is circular in all points except at the point of retraction and at the point of protrusion, and is of such diameter, with respect to the diameter of the drum, that throughout the circular part of the same, the plungers will be held with their free ends within the drum and approximately flush with the periphery of the same. The grain from the seed box drops onto the interior surface of the drum and tends to seek the lowest point of the same, under the forward motion of the drum. Hence the cells, when at or near the lowest point, will always contain seeds or kernels of grain. The radial holes through the periphery of the drum, and the angle of retraction in the cam channels are so related, that only a single kernel or seed will be admitted to the holes when the plungers are retracted to their limit. This occurs, as before stated, just before that particular plunger bar and corresponding cells reaches the lowest point of its travel. From this time until it reaches its very lowest point, the grain or seed will be held within the radial passage by the contact of the drum with the ground. When the lowest point is reached, the projecting angle of the cam channel comes into effect to force the plunger bar radially outward and project the plungers through the periphery of the drum and into the ground, carrying the seed or kernels of grain with the same, and depositing them at the desired depth. Under the continued movement of the drum the plunger bar is retracted immediately into its normal position, and the rolling action of the drum will close the holes made in the ground by the plungers, and effect a loose covering of the seed or the grain. Inasmuch as the seed is carried down into the ground, by the positive action of the plungers or seeding fingers, the seed bed on which the seed or kernel of grain is left will be packed, which result is very desirable, as is well known, for the purpose of drawing moisture. In other words, with my machine, I get the well known desired advantages of a packed seed bed and a loose covering, and in addition, gain the peculiar advantages of my special construction or new principle of depositing the seeds or kernels of grain with uniform spacing and only a single kernel or seed in a place. The roller action is also a good one inasmuch as it crushes the clods, and levels the surface, having, in this respect, all the advantages of an ordinary roller.

It should be noted that the plunger bars F are made in sections. In other words, instead of running single plunger bars the entire length of the drum, they are divided into two or more sections, as may be found desirable; and corresponding additional cam channel heads are placed, intermediate the end heads, for effecting the radial movement of the plunger bars and seeding fingers. In the machine shown in the drawings, a single intermediate cam channel head is shown, located midway between the end heads. The purpose of thus dividing the plunger bars into short sections is to permit the same to be made relatively light while preserving the requisite rigidity.

It will of course be understood that many modifications might be made in the construction of the different parts of my machine, without departing from the principle of my invention. The drum with multiple rows of radial perforations and corresponding plunger bars with radial plungers or seeding fingers working there through by a cam movement, under the rotary motion of the drum, is the most convenient and efficient construction, known to me, for carrying out my principle of depositing the seeds or kernels of grain one in a place. But I do not desire to limit myself to this particular construction for the purpose. I believe myself to be the first to have invented any means for effecting this result; and any means whatsoever which will deposit kernals of grain one seed at a time with uniform spacing on a packed seed bed and with a loose covering, is within the principle of my invention.

Of course, it will be understood, that the angle of retraction in the cam-channels may be arranged to retract the radial plungers or seeding fingers to a sufficient extent to admit more than one kernel in each of the radial holes, and thus deposit several kernels, if so desired, when the plungers are forced outward. In many cases, it may be desirable to deposit two or three kernels or seeds in a place. Even when thus planted in hills of two or three kernels in a place, a great advantage is secured over seeding in drills.

What I claim, and desire to secure by Letters Patent of the United States, is as follows:

1. A seeder for depositing grain or seed in the ground, one or more kernels in a place, with uniform spacing, the same comprising a perforated drum, revoluble over the ground, and seeding fingers working through said perforations adapted to be set to permit the entrance of the kernels from the interior of the drum and force the same into the ground.

2. A seeder comprising a perforated drum revoluble over the ground, cam channel heads concentric with the drum, a frame carried by the drum and supporting the said heads in a fixed position relative to the movement of the drum, a series of plunger bars having their extremities working in the cam channels of the said heads and provided, each with a series of seeding fingers working through the perforations of the drum, whereby seed or grain supplied to the interior of the drum may be forced through the perforations of the same and into the ground, under the action of the said fingers.

3. The combination with the perforated drum having cells on its interior surface, the centers of which co-incide with the perforations of the drum, and seeding fingers working through the said perforations, under the movement of the drum, whereby kernels of grain supplied to the interior of the drum will be directed to the perforations by the cells and be forced through the same and into the ground by the said fingers, substantially as described.

4. The combination with the perforated drum, having cells on its interior surface, the centers of which co-incide with the perforations in the drum, of the frame journaled in the drum heads, the cam channel heads and the seed-box within the drum, supported by the said frame, a forced feed in the seed-box, the series of plunger bars working in the cam channels, and the radial plungers or seeding fingers carried by the said bars and working through the perforations of the said drum, substantially as described.

5. The combination with the perforated drum and the plunger bars having radial plungers or seeding fingers working through the said perforations of the drum, of the fixed cam channel heads provided with cam channels for operating said plungers, under the motion of the drum, and having adjustable sections for varying the depth of the plant and for throwing the plunger bars with their seeding fingers into and out of their seeding action.

6. The combination with the perforated drum of the plunger bars with radial plungers working through said perforations, the cam channel heads having cam channels with adjustable sections, and connections for moving the said adjustable sections, to set the same in any desired position, substantially as described.

7. The combination with the perforated drum, the plunger bars with radial plungers working through the perforations, and the fixed heads, of cam channels having fixed and adjustable sections located on the said heads, the adjustable sections consisting of pivoted overlapping flanges for the outer wall of the cam channel and a radially movable block seated in the head, provided with angular surfaces adapted to form the continuation of the inner wall of the cam channel, and provided with a laterally projecting flange adapted to support the overlapping parts of the said pivoted flange.

8. The combination with the cam channel heads having cam channels with adjustable sections, of the seed-box with a forced feed, and connections controllable from a common source for co-incidently throwing the adjustable sections of the cam channels into and out of their operative positions for the seeding action and for throwing the driving connections to the forced feed in and out of gear, substantially as described.

In testimony whereof I affix my signature in presence of two witnesses.

OLAF ERICKSON.

Witnesses:
J. H. ERICKSON,
JAS. F. WILLIAMSON.